Feb. 19, 1924.
A. E. DOMAN
1,484,479
ELECTRICAL POWER TRANSMISSION DEVICE
Filed Aug. 13, 1918      4 Sheets-Sheet 2
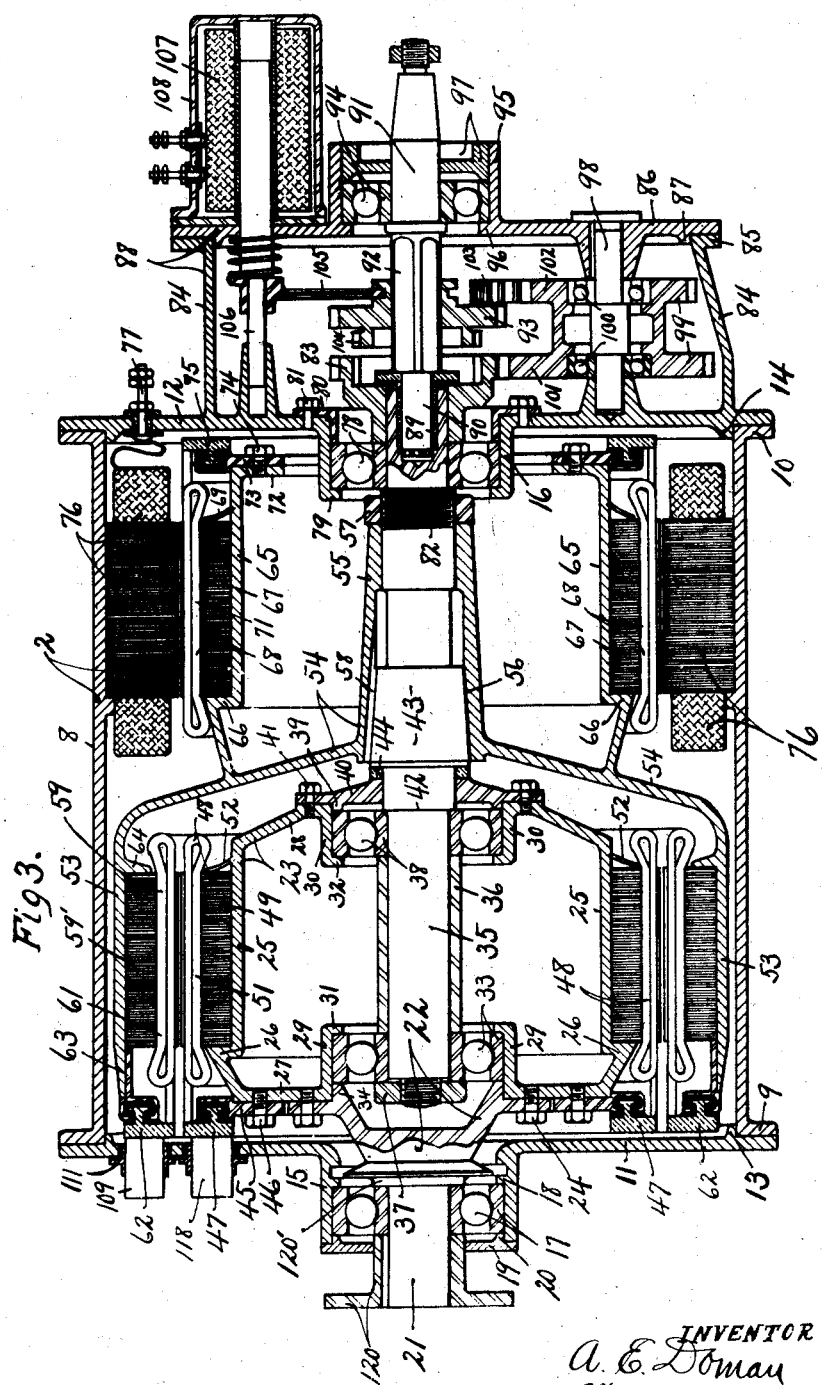
INVENTOR
A. E. Doman
BY
Howard P. Denison
ATTORNEY Feb. 19, 1924. 1,484,479
A. E. DOMAN
ELECTRICAL POWER TRANSMISSION DEVICE
Filed Aug. 13, 1918 4 Sheets-Sheet 3
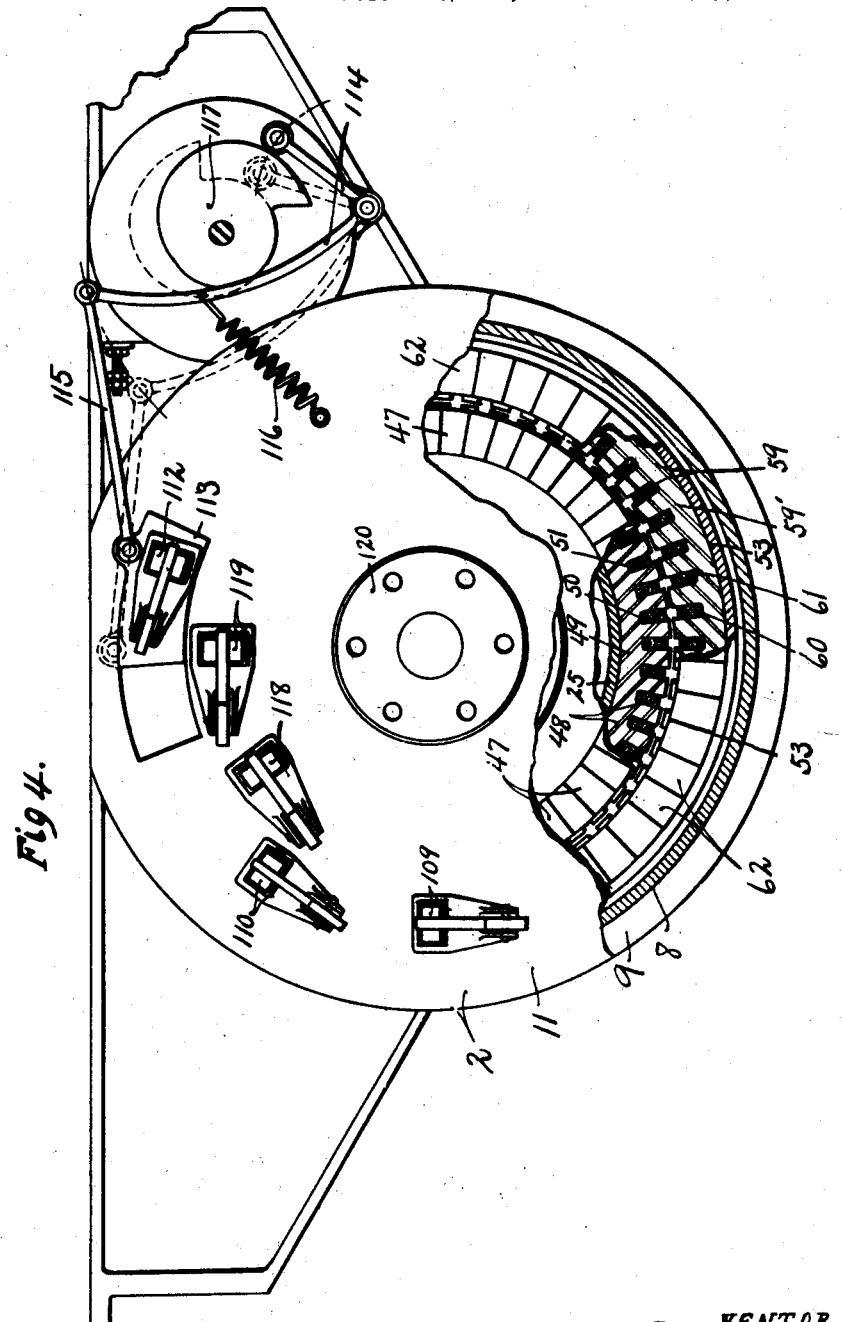

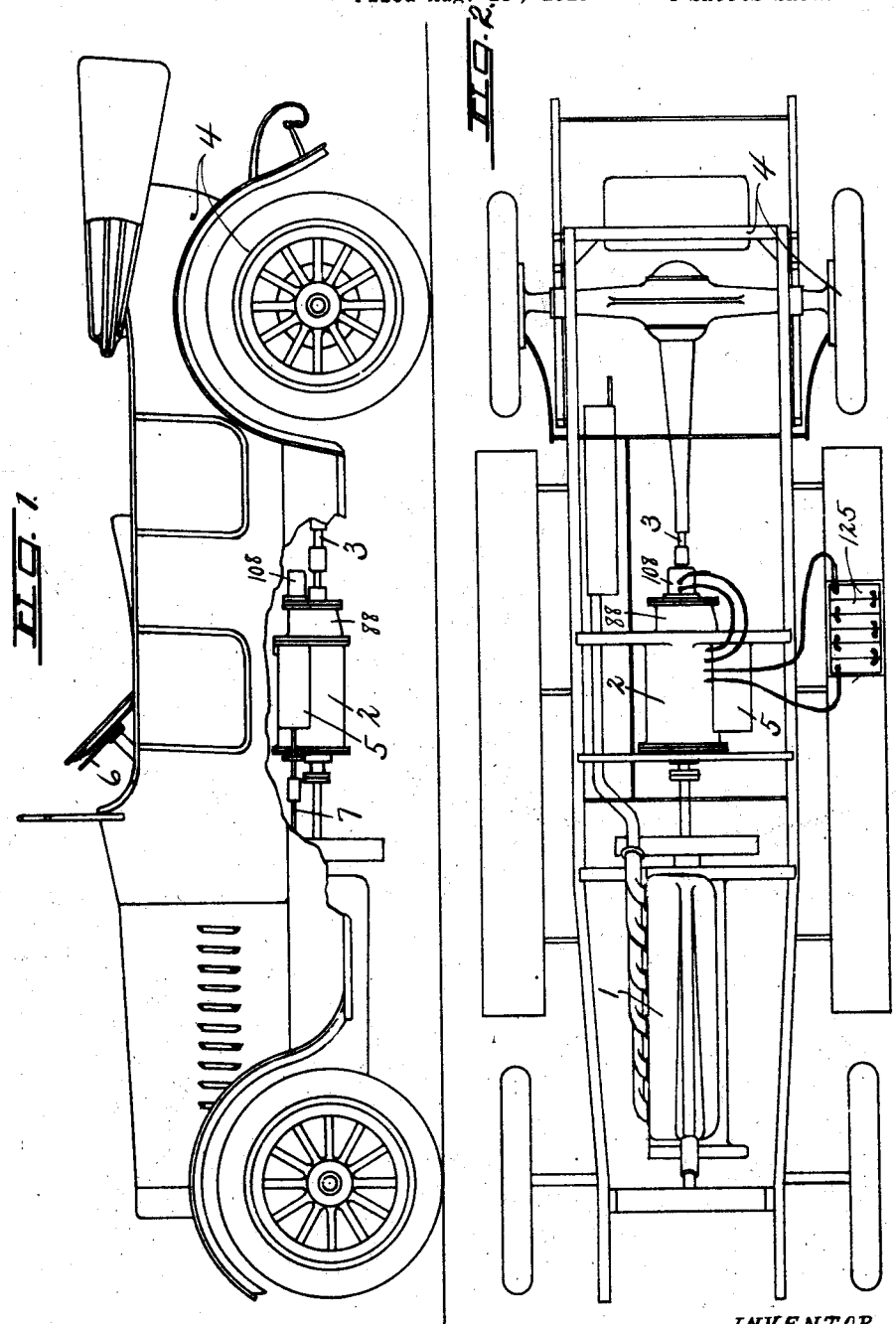

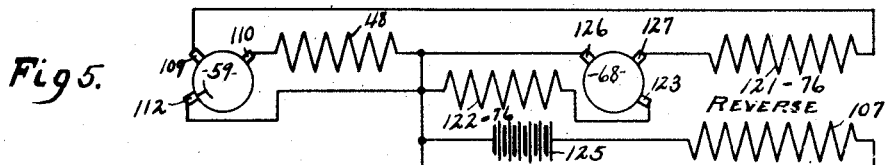
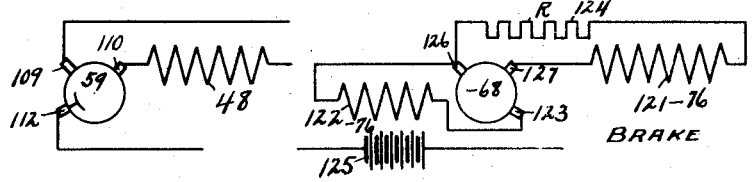
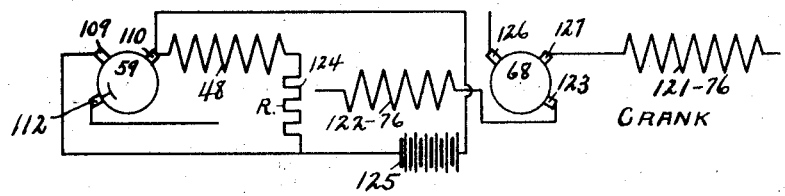
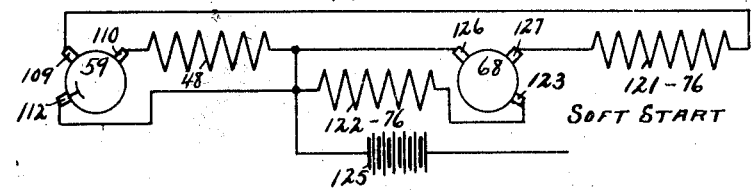
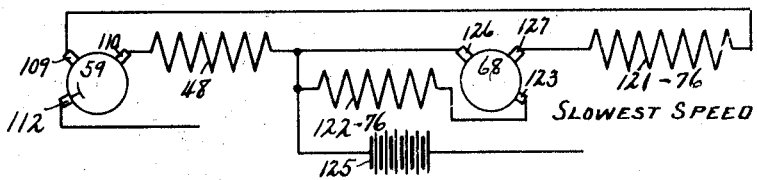
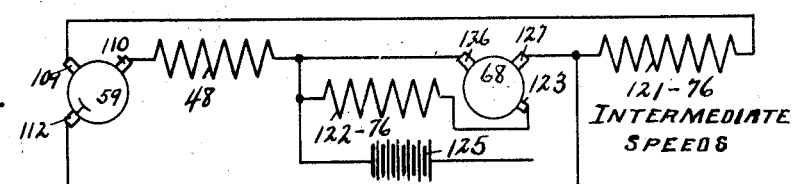
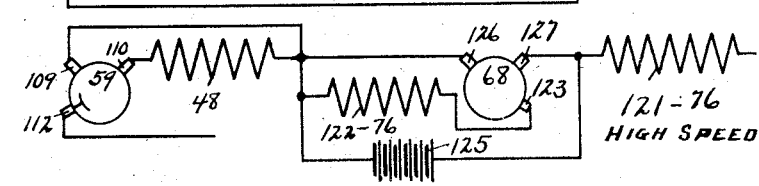

Patented Feb. 19, 1924.

1,484,479

UNITED STATES PATENT OFFICE.

ALBERT E. DOMAN, OF ELBRIDGE, NEW YORK, ASSIGNOR TO OWEN-DYNETO CORPORATION, OF SYRACUSE, NEW YORK, A CORPORATION OF NEW YORK.

ELECTRICAL POWER-TRANSMISSION DEVICE.

Application filed August 13, 1918. Serial No. 249,893.

*To all whom it may concern:*

Be it known that I, ALBERT E. DOMAN, a citizen of the United States of America, and resident of Elbridge, in the county of Onondaga, in the State of New York, have invented new and useful Improvements in Electrical Power-Transmission Devices, of which the following, taken in connection with the accompanying drawings, is a full, clear, and exact description.

This invention relates to certain improvements in electrical power transmission devices, and is particularly adapted for electrically effecting and controlling the transmission of power from a prime mover, such as an internal combustion engine for automobiles, to a driven part, as the rear axle of the automobile, as a substitute for the gear transmission device found at present in such machines.

The primary object of the invention is to provide an electrical power transmitter so constructed that when used with a power producer or prime mover, such as an internal combustion engine, whose maximum torque is limited, it will deliver power to a driven part, such as the axle of a vehicle, at a slower speed but with increased torque, the torque varying inversely with the speed.

Another object relates to improved means of regulation accomplishing a smooth starting of the motor and a gradual change from one degree of torque to another in the transmission of power, thereby avoiding limiting the control to a specific number of steps which when employed produces a jolting effect as the connections are changed from one step to another.

Other objects relate to the mechanical features of the device whereby a simple, efficient, rigid, easily assembled, compact apparatus is produced for accomplishing the primary objects of the invention and without involving the use of collector rings, revolving brushes, and the like.

Further objects and advantages will appear from the following description, taken in connection with the accompanying drawings, in which—

Figure 1 is a side elevation of an automobile having a portion broken away to disclose an installation of the electrical transmission of this invention.

Figure 2 is a top plan view of the same.

Figure 3 is a longitudinal section through the main body of the transmission.

Figure 4 is an end view of the same, partially broken away to disclose portions of the commutators and the armature and field of the apparatus.

Figures 5 to 11 are diagrammatic views illustrative of circuits hereinafter described.

The specific installation shown comprises a prime mover, such as the internal combustion engine —1—, a transmission —2—, a drive shaft —3— having a suitable connection through a differential mechanism with the rear axle of the automobile —4—; a controller —5— adapted to be operated by a lever —6— through the medium of an operating link —7— in any suitable and well-known manner not herein necessary to further illustrate or describe.

The transmission —2— with which this invention is specifically concerned comprises a cylindrical case —8— having circumferential radial flanges —9— and —10— at its ends, with which cap plates —11— and —12—, respectively, contact, said plates being provided with circular axially extending flanges —13— and —14, respectively, interlocked with the inner surface of the opposite ends of the cylindrical case —8—, and the flanges and the cap plates may preferably be removably secured together in any suitable manner, as by bolts not shown, or may, if desired, be permanently secured together by spot-welding, riveting, or the like.

The cap plates —11— and —12— are provided with aligned axially-extending circular flanges —15— and —16—, respectively, the flanges —15— being of sufficient diameter to receive a suitable ball bearing —17— confined between a radial flange —18— upon the axial flange —15— and a cap plate —19— having an axial flange —20— fitted within the flange —15— and extending into substantial contact with the ball bearing —17— to hold the outer ring of the same in contact with the flange —18—, and the cap —19— and flange —15— may be secured together in any suitable manner, as by screws, bolts, or the like, not necessary to further illustrate or describe.

A suitable shaft —21— is journaled in the bearing —17— and carries a radially projecting and axially-extending spider —22—, which spider, in turn, carries a shell —23— rigidly secured thereto in any suitable manner, as by bolts —24—.

The shell —23— is formed with a cylindrical portion —25— having a radially and outwardly extending flange —26— and radially and inwardly extending flanged end portions —27— and —28— terminating in inwardly projecting axial circular flanges —29— and —30—, the flanges —29— and —30— being provided with substantially circular radial flanges —31— and —32—, respectively.

The flange —29— is mounted upon a ball-bearing —33—, the outer ring of which is confined between the flange —31— and an axial flange —34— formed upon the spider —22—. The ball-bearing —33— is, in turn, carried by a driven shaft —35— and its inner ring is confined between a sleeve —36— upon the shaft and a nut —37— adjustably engaged with the end of the shaft.

The flange —30—, in like manner, is mounted upon a ball-bearing —38—, the outer ring of which is confined between the flange —32— and a portion, as the axial flange —39—, of a cap —40— secured to the shell —23— in any suitable manner, as by bolts —41—, and having a central opening for the passage of the shaft —35—.

The ball-bearing —38— is likewise mounted on the shaft —35— and its inner ring is confined between a flange —42— on said shaft and the sleeve —36—. The cap —40— is spaced from the base flange of an enlarged frusto-conical portion —43— formed upon the shaft —35— in any suitable manner, as by a ring —44—, or thrust washer.

The shell —23— carries an annular plate —45— secured thereto in any suitable manner, as by bolts —46—, which plate, in turn, carries a commutator —47— of the face-plate type. The cylindrical portion —25— of the shell —23— is adapted to receive and carry a field —48— comprising a magnetizable cylindrical body —49— of any suitable or desirable material having a series of longitudinally extending grooves —50— for the reception of suitable winding —51—, and the magnetizable body —49— is adapted to abut against the flange —26— and is confined in this position by a locking ring —52— suitably engaged with the periphery of the shell —23—.

The parts so far described constitute a rotatably-supported field magnet system telescoped within the enlarged cylindrical portion —53— of a funnel-shape frame —54— provided with an elongated bearing —55— mounted on the shaft —35— and formed with a tapered portion —56— for engagement with the frusto-conical portion —43— of the shaft —35—, such engagement being rendered tight and suitably rigid through the medium of a nut —57— having a threaded relation with the shaft —35— and abutting against the end of the bearing —55—.

The frame —54— may be locked to the shaft —35— for simultaneous rotation in any suitable manner, as by a suitable key and keyway —58—. The cylindrical portion —53—, concentric with the cylindrical portion —25— of the shell —23—, in turn carries a cylindrical magnetizable body —59'— having a series of longitudinally extending grooves —60— in its inner surface adapted to carry winding —61—, the entire assemblage constituting an armature —59— so wound as to have a number of poles suitable for use with the field magnet system —48—.

This armature is likewise provided with a suitable commutator —62— of the face-plate type carried by a plate —63— secured in any suitable manner to the cylindrical portion —53—, and preferably having its edge in contact with the cylindrical magnetizable core —59'— and adapted to hold the core —59'— against a radial flange —64— extending inwardly from the cylindrical portion —53— of the frame —54—.

The frame —54— is further provided with an axially extending circular flange forming a drum —65— of substantially the same diameter as the shell —23— and formed in like manner as the shell —23— with a radial circular flange —66— against which the cylindrical core —67— of an armature —68— is adapted to abut, the core being held in that position by a locking ring —69— having suitable engagement with the drum —65—.

The core —67— is provided with a series of longitudinally extending grooves —70— for the reception of suitable winding —71—. The drum —65— is provided with a radially and inwardly extending flange —72— adapted to carry an annular plate —73— rigidly secured thereto in any suitable manner, as by bolts —74—, the plate, in turn, carrying a commutator —75— of the face-plate type.

A suitable field magnet system —76— for the armature —68— is rigidly secured to the cylindrical casing —8— in any suitable manner, not necessary to further illustrate or describe, and is electrically connected to suitable binding posts —77— carried by the cap —12—.

The flange —16— on the cap plate —12— is mounted on a ball-bearing —78—, the outer ring of which is confined between a radial flange —79— on the flange —16— and an angular locking ring —80— secured to the cap plate —12— in any suitable manner, as by bolts —81—.

The ball-bearing —78— is, in turn, mounted on the shaft —35— and its inner ring is confined between a shoulder —82— formed on the shaft and a suitable internal external gear member —83— secured to the shaft in any suitable manner so as to rotate therewith.

The cap plate —12— is further provided with a longitudinally projecting flange —84— having a radial flange —85— with which the edge portion of a suitable closure —86— is adapted to contact, the closure being provided with an axially extending flange —87— in contact with the inner surface of the flange —84—, the parts being preferably removably secured together in any suitable manner and forming a gear casing —88— somewhat eccentric to the case —8—.

The end of the shaft —35— adjacent the gear casing —88— is preferably counterbored for the reception of a sleeve —89—, within which is mounted the reduced end portion —90— of a driven shaft —91— having an angular portion —92— upon which a combined gear and clutch member —93— is slidably mounted. The other end of the shaft —91— is mounted in a ball-bearing —94— carried by a flange —95— formed on the closure —86— and axially aligned with the flanges —15— and —16—, heretofore described. The ball-bearing —94— may be confined between a flange —96— upon the closure and a locking member —97— suitably engaged with the flange —95—.

Within the casing —88— and having its ends respectively mounted in the cap plate —12— and closure —86—, is a shaft —98— carrying a double gear —99— through the medium of ball-bearings —100—.

One of the gear members, as —101—, is adapted to mesh at all times with the external gear of the gear member —83—, while the other gear —102— is adapted to mesh with an idler —103— which may be supported in any suitable manner, which idler, in turn, is adapted to mesh with the gear —93— when the same has been moved to proper position along the shaft —91—.

The gear —93— is provided with a clutch member —104— adapted to be normally interlocked with the internal gear of gear member —83— to cause simultaneous rotation of shaft —35— and shaft —91—, and this condition is maintained through the medium of an arm —105— rigidly carried by a bar —106— and having a suitable engagement with a circular channel in the gear —93—, the bar —106— being normally spring-pressed to move the member —105— into locking engagement with the internal gear of gear member —83—.

Electrical means, such as the electromagnet or solenoid —107— is provided for moving the shaft —106— longitudinally as desired to release the locking engagement described and to bring the gear —93— into mesh with the idler —103— to reverse the direction of rotation of the driven shaft —91—. The magnet or solenoid —107— may be of any suitable or known construction and, as shown, is supported within a cup-shape casing —108— secured in any suitable manner to the closure —86—.

Suitable brushes —109— and —110— are provided in connection with the commutator —62— and said brushes are movable, as best shown in Figures 3 and 4, through sleeves —111— extending through the cap plate —11—, and are spring-pressed into contact with the commutator, and in combination with the brushes —109— and —110— is provided an adjustable third brush —112—, in like manner spring-actuated and movable through an opening in the cap plate —11—, but carried by a bracket —113— movable relatively to the cap plate —11— to vary the position of the brush —112— relatively to the commutator for regulating purposes, as hereinafter described.

This adjustment of the third brush —112— may be accomplished in any suitable manner, and, as shown, the bracket —113— is operated by a rock arm —114— through the medium of a link —115— pivotally connected to the bracket —113—, said rock arm being normally held at the limit of movement in one direction by a spring —116— which may, as shown, be engaged with the rock arm and with the cap plate —11—, a suitable cam —117— or other suitable means being provided for rocking the arm —114— against the tension of spring —116— to adjust the brush as desired. The cam —117— may be operated in any suitable manner and through any suitable connections, either independently of or conjointly with the controller, determining the electric circuits hereinafter described, and is usually directly actuated through a lever which may be mounted on the steering wheel of the vehicle in a manner similar to the spark and gas controls.

Suitable brushes, as —118— and —119—, are also provided for the commutator —47— and are supported and spring-pressed into engagement with the commutator in like manner, as heretofore described in connection with the brushes —109— and —110—.

The commutator —75— is likewise provided with suitable brushes, identified in Figures 5 to 11, inclusive, as —126— and —127—, but operating through the cap plate —12— in like manner as shown and described in connection with brushes —109— and —110—, and preferably there is provided in connection with the commutator —75— a third brush for accomplishing the regulation of current generated to charge the battery as hereinafter described, and as illustrated in Figures 5 to 11.

The shaft —21— has secured thereto for simultaneous rotation an angular union

—120— by means of which the driving shaft may be connected to the shaft —21— for simultaneous rotation and the inner ring of ball bearing —17— may be confined between the union —120— and flange —120'— formed on shaft —21—.

The field magnet system —48— is so constituted and connected that it has a suitable number of magnetic poles when current is passing through it, but as the part revolves the poles do not revolve in a mechanical sense but maintain their position due to the action of commutator —47— and brushes —118— and —119—. In other words, as the field magnet system —48— revolves and the current flows through it by way of brushes —118— and —119—, the brushes being fixed, the magnetic pole of the field also remains fixed, and inasmuch as the poles are fixed, the necessity of using collector rings and of having the entire brush-holder system revolve with the poles, is obviated.

In a general way the operation of the transmission is as follows:—A comparatively small storage battery, as the battery —125—, is usually provided for the purpose of starting the engine and, as heretofore described, any suitable controller is employed to make the necessary electrical connections, as hereinafter described.

In starting, the shaft —35— is held by the usual emergency brake on the rear wheels, or otherwise, so that it cannot revolve and the battery current is connected to flow through field magnet system —48— and armature —59—, the armature —59— being held stationary with the shaft —35—.

The field magnet system —48— begins to revolve, thus cranking the engine through the medium of shaft —21— and its connections. As soon as the prime mover runs under its own power, the slip between —48— and —59— causes an electromotive force to be set up and by the operation of the controller —48—, —59—, —67— and —76— are all electrically connected so that the current generated by the relative movement of —48— and —59— is transmitted through —67— and —76— so that the shaft —35— upon release of the brake is driven at a speed relatively low to that of —48—, but with increased torque.

Various connections of the controller, as hereinafter specifically described, provide a graded torque effect to meet any requirements between the conditions just described and those wherein the speed of —48— and the shaft —35— are about equal, the torque varying inversely with the speed of the shaft —35—.

When the road resistance of a vehicle or the torque required has become so reduced that the prime mover can carry the load directly (that is, as on high gear with the ordinary gear transmission), the controller is so arranged that the field magnet system —48— and armature —59— will be short-circuited, as through respective commutator brushes, so that the current generated spends itself through —48— and —59— in the production of a very intense magnetic field which tends to carry the armature —59— at about the same speed as the driven field magnet system —48—, the only difference being the slip that is required to set up enough voltage to cause sufficient current to produce this magnetic clutching effect.

During the time (practically all the time) that the controller is connected for high speed service, just mentioned, armature —67— and field magnet system —76— are connected to act as a generator for re-charging the storage battery which may be used for starting, lighting, or any other service requiring electrical current of the character generated.

Any suitable controller operated as described through the medium of a lever —6— may be provided for producing the circuits shown in Figures 5 to 11, Figure 5 indicating the reverse speed condition.

The field magnet system —48— is not shown in these figures as a revolving part provided with suitable brushes because it will be more clearly understood if this part is simply considered as a field magnet system.

The numbers —121— and —122— represent, respectively, a series winding and a shunt winding for the field magnet system —76—, and in connection with the shunt winding —122— a third brush —123— is indicated.

This brush is used to regulate the amount of current that will be generated to charge the battery in Figure 11, the exact position or adjustment of this brush being immaterial. Instead of the third brush regulation, what is known as a bucking field, or any other system of regulation may be used to control the current generated.

—124— represents a resistance coil which may or may not be used, the same being omitted in some of the figures; a storage battery —125— being indicated for starting the prime mover and adapted to be charged when the armature —68— and field magnet system —76— are operating as a generator.

Figure 7 indicates the connections for starting the engine. It will be noted that the armature —59— with field magnet system —48— and resistance —124— are in multiple with the battery, but if desired the connections could be changed so that the different elements would be in series. In this same position, the battery may be recharged without operating the car if desired. It will be noted that the armature —68— is not connected for any service.

Figure 8 shows the connections used for starting the car very slowly from a standstill. It will be seen that armature —59—, field magnet system —48—, armature —68—, and winding —121— of field magnet system —76— are in series. It will also be seen that third brush —112— has a connection to one side of the field magnet system—48—.

As described, the third brush —112— is adjustable as to its position on the commutator so that it may have a weakening or shunting effect on any current through the field magnet system —48—. Or, it may be so placed that it will have practically no effect.

For the position just mentioned, it has a weakening effect so that field magnet system —48— and armature —59—, considered as a generator, will generate a gradually increasing current which will have the effect of smoothly starting the motor comprising the armature —68— and field magnet system —76—. It will be noted that the battery is not in service.

Figure 9 shows connections for the slowest speed and greatest torque, the armatures —59— and —68— with their series windings being connected in series. The third brush —112— is not shown as connected. The shunt winding —122— may be or may not be connected, as shown.

Figure 10 represents the connections for intermediate speeds. In this case, the connections are the same as in Figure 9, except that the third brush —112— is connected and so positioned as to have a weakening effect on the winding —121—, thereby causing armature —68— to revolve at a higher speed, but with reduced torque. Any intermediate speed may be obtained by a suitable movement of brush —112—, as the weakening effect referred to may be increased or diminished at will. In fact, the effect can be entirely neutralized if desired, as stated in reference to Figure 8.

Figure 11 shows the connections for high speed in which field magnet system —48— and armature —59— are short-circuited upon themselves. The third brush —112— is disconnected. The shunt winding —122— and armature —68— are connected in multiple with the battery so that the latter may be charged. The series winding —121— may or may not be used.

Although I have shown and described one particular construction, form, relation of the parts, and one particular sequence of circuits as accomplishing perhaps in a preferred way the objects of this invention, yet it should be understood that I do not limit myself to any specific construction, form or relation of the parts, or to any specific sequence of specific circuits, as many and various changes may be made with reference to each of the same without departure from the scope of this invention as set forth in the appended claims.

What I claim is:

1. A power transmission mechanism comprising a driving shaft having a spider rigidly associated therewith, a cylindrical shell secured to the spider and axially aligned with the driving shaft, a field magnet system mounted on said shell, a driven shaft extending axially of and within the shell and rotatably associated with the shell to prevent independent radial movement of either the shell or driving shaft, a frame having a portion telescoped outside the field magnet system, another portion mounted on said driven shaft for simultaneous rotation therewith, an armature carried by the portion telescoped with the field magnet system, said frame provided with a flange concentric with the driven shaft and carrying a second armature and a field magnet system for said armature.

2. Power transmission mechanism comprising a driving shaft having a radially extending flange, a magnet support secured to the flange and axially aligned with the driving shaft, a field magnet system mounted on said support, a pair of spaced bearings carried by said support, a driven shaft journaled in said bearings, an armature for said field magnet system rotating with the driven shaft and telescoped externally with the field magnet system, a second armature rotating with the driven shaft, and a field magnet for said armature.

3. Power transmission mechanism comprising a driving shaft, a support carried thereby, a field magnet system carried by the support, a driven shaft journaled in the support, a frame having a portion journaled on the driven shaft and locked thereto for simultaneous rotation, said frame having another portion telescoped externally with said support, an armature carried by the portion telescoped with the support, a second armature rotating with the driven shaft, and a field magnet for said armature.

In witness whereof I have hereunto set my hand this 19th day of July, 1918.

ALBERT E. DOMAN.

Witnesses:
ALICE M. CANNON,
E. A. THOMPSON.